O. VANORMAN.

CARBURETOR.

No. 11,430. Reissued July 10, 1894.

WITNESSES.

Geo. E. Frech

Roland W. Fitzgerald

INVENTOR

Oliver Vanorman per

Lehmann & Pattison,

Attys.

UNITED STATES PATENT OFFICE.

OLIVER VANORMAN, OF LOS ANGELES, CALIFORNIA, ASSIGNOR OF ONE-HALF TO FRANK J. COOPER, OF SAME PLACE.

CARBURETOR.

SPECIFICATION forming part of Reissued Letters Patent No. 11,430, dated July 10, 1894.

Original No. 457,803, dated August 18, 1891. Application for reissue filed December 10, 1891. Serial No. 414,639.

*To all whom it may concern:*

Be it known that I, OLIVER VANORMAN, a citizen of the United States, residing at Los Angeles, in the county of Los Angeles and State of California, have invented new and useful Improvements in Carburetors; and I do hereby declare the following to be a full, clear, and exact description of the invention, such as will enable others skilled in the art to which it pertains to make and use it, reference being had to the accompanying drawings, which form part of this specification.

This invention has relation to an apparatus for carbureting air by charging atmospheric air with vapors from heavy and light oils, respectively and separately, and it consists in the construction, arrangement and combination of parts which will be fully described hereinafter and particularly referred to in the claims.

The object of my invention is to produce carbureted air for burning or other purposes, by passing air through oils of different specific gravities which are contained in separate chambers, and in the present instance, the air is first passed through a heavy oil, such as crude petroleum contained in a tall and proportionately slim chamber and then pass this carbureted air through a lighter and more volatile oil such as benzine, which latter is also contained in a separate tall and proportionately slim chamber.

I do not make in this application any claim to the process, as this is made the subject matter of a separate application filed January 6, 1891.

Figure 1:
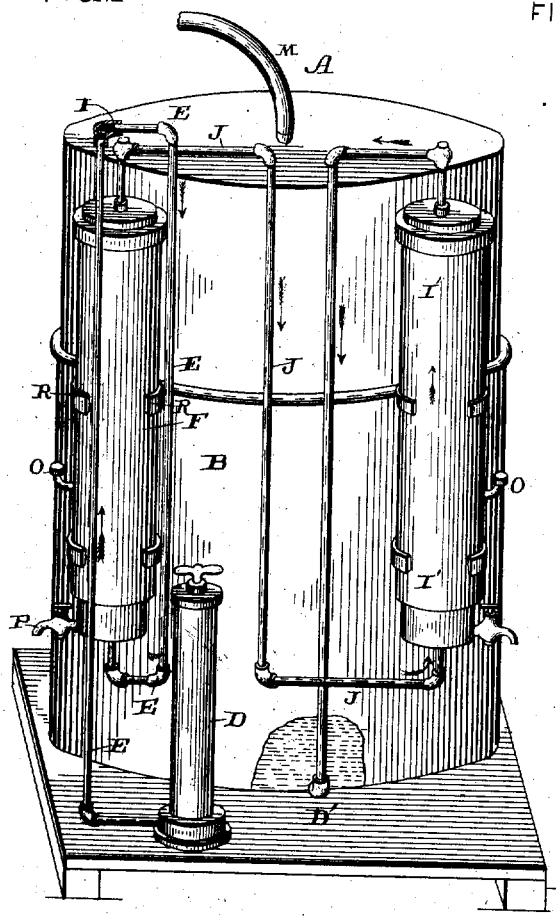
Figure 2:
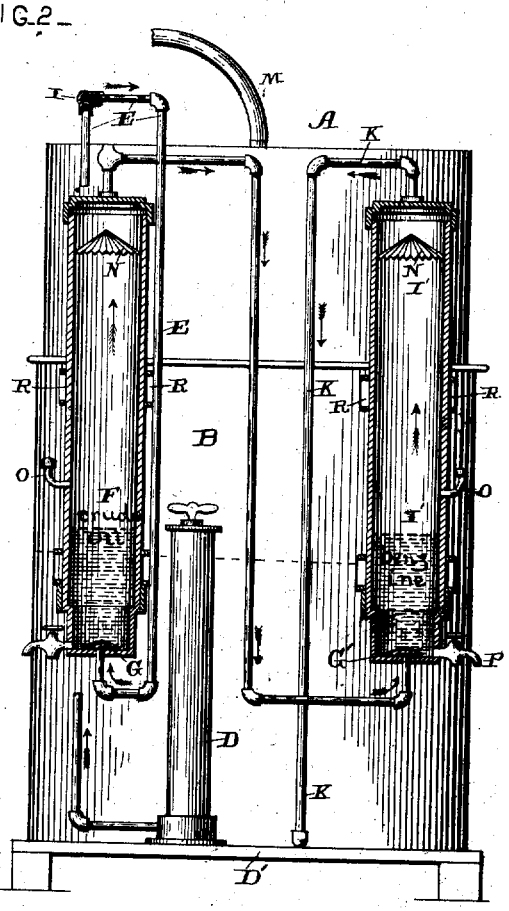
Figure 3:
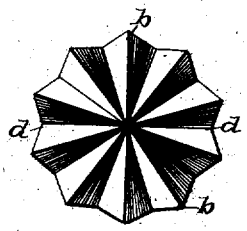
Figure 4:
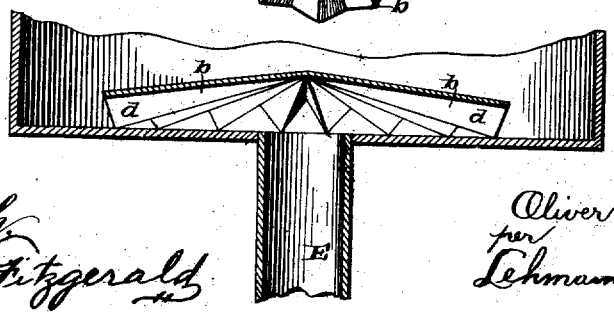

In the drawings:—Figure 1 is a general perspective view of a machine which embodies my invention. Fig. 2 is a similar view with the carburetors shown in vertical mid section. Fig. 3 is a top view of my improved deflector or distributing device. Fig. 4 is a vertical mid section of the bottom of the carburetor with the distributer in place thereon.

A, indicates a gasometer of the ordinary construction, the lower portion B, of which is filled with water. For the purpose of compactness and convenience in transporting the same, the gasometer is placed upon a platform D′, of convenient and suitable dimensions, and an air pump D, beside it, which latter is secured to the platform in any suitable manner.

In my apparatus, air is forced by means of the pump D, through a pipe E which has its lower end communicating with the pump. This pipe E extends up above the top of a tall narrow tank F, and then downward doubling upon itself as shown, and enters the bottom of the said tank. Placed within this tank is a small quantity of crude oil or petroleum, through which air is forced from the pump. As the air passes into the bottom of the tank F it strikes the under side of the fluted conical deflector G, which is placed directly over the inlet end of the pipe E, the specific construction and operation of which will be fully described hereinafter.

The object of extending the pipe E above the tank F as shown is to prevent the oil within the tank from working back into the pump as it would do if the said pipe entered the bottom of the tank directly from the pump as will be readily understood. Placed in the upper end of the pipe E at the point I is a check valve for the purpose of preventing any back pressure on the pump as would otherwise be the case.

A pipe J has one end connected with the upper end of the tank F and its opposite end extending upward into the bottom of a separate tall narrow tank I′, which tank is also provided with a fluted conical deflector G′ similar to the deflector G placed in the bottom of the tank F. This tank I′ has a suitable quantity of benzine or gasoline through which the air is forced from the tank F as will be more fully described farther on. Attached to the upper end of this tank I is a pipe K which extends downward to the lower edge of the portion B of the gasometer A where it connects therewith for conveying gas therein. A flexible pipe M is connected to the top of the gasometer through which gas is conveyed or distributed to any desired point or points.

The purpose of connecting the two tanks by means of a pipe J which extends from the upper end of the tank F to the bottom of the tank I′ is to prevent any possibility of the oil working from one tank to the other by backward or forward pressure, as it would otherwise likely do. This is a very important construction, for should the oils become mixed the efficiency of the apparatus would be proportionately deteriorated.

The tanks F and I′ are supported in position by means of small lugs R which are soldered to the sides of the gasometer and lap around the tanks as shown. This construction is used as a matter of convenience and protection for the tanks F and I′ and for the further object of producing small machines where it is desired that they be as compact as possible, which is the special purpose of my apparatus.

The deflectors G and G′ are secured to the bottoms of the tanks F and I′ directly over the ingress ends of the pipes E and J and each made conical and fluted as shown to form radial air channels. The corrugations or channels are triangular in cross section and widened or enlarged outward and downward radially from the apex to the rim thereof. As the air is fed to the tanks F and I it strikes the under sides of the deflectors G and G′ and by reason of their shallow construction do not allow the collection of a large bubble of air; but immediately the air reaches the apex it begins to descend in the radial channels *d*, to the periphery thereof, and is thus distributed in the oil of the tanks for the purpose of better collecting and carrying the volatile particles thereof to convert it into gas.

The ridges *b*, which increase in size from the center to the circumference of the deflector, obstruct the hydrocarbon liquid and prevent it from moving with the swashing movement which I desire to prevent.

Secured within each tank F and I′ near their upper ends are the deflectors N, which are similar in shape to the deflectors G and G′ for the purpose of preventing the oils being forced from one tank to the other as would likely happen should the pump be run more rapidly than the length of the tanks would permit.

In operation, air is forced by the pump D into the bottom of the tank F, against the deflector G which distributes it through the crude petroleum placed therein to collect the volatile particles thereof, saturating the air with heavy vapor. This carbureted air is forced through the pipe J to the bottom of the tank I′ where it is distributed by a deflector G′ through the fluid placed therein, it then escaping from the tank I through the pipe K, to the bottom of the gasometer. This tank I′ is charged with a quantity of lighter oil than that contained in the tank F, the quantity and gravity thereof to be regulated in accordance with the size of the machine.

Having thus described my invention, I claim—

1. In a carburetor, the combination with a gasometer, of two fluid tanks each having air inlets in their bottoms, conical air deflectors inclosing the said air inlets, the deflectors having radial channels which terminate at a common central point over the said inlet, whereby the inflowing air strikes this central common point and is distributed throughout the said radial channels forming minute streams at the periphery of the deflector, an air supply, a pipe connecting the air supply with the inlet of one tank, a pipe connecting the upper end of this tank with the inlet of the other tank, and a pipe connecting the upper end of this last named tank with the bottom of the gasometer, substantially as specified.

2. The combination, with a carbureting tank having an unobstructed open-mouthed air-ingress pipe opening upward through the floor of such tank, of a flat circular deflector having the under face provided with the flat conical corrugated chamber having its channels enlarged downward and outward from the apex to the rim of the deflector, said deflector being fixed in place upon the floor with its conical chamber coaxial with the air-ingress pipe, so that the ascending air forced through the air-ingress pipe will be received in the flat apex of the chamber of the cap and distributed through the channels to the rim of the deflector.

In testimony whereof I affix my signature in the presence of two witnesses.

OLIVER VANORMAN.

Witnesses:
L. J. DIERSSEN,
H. STURDEVANT.